United States Patent
Yun (10) Patent No.: US 12,430,076 B2
(45) Date of Patent: Sep. 30, 2025

(54) STORAGE DEVICE FOR COMPRESSING AND STORING DATA, AND OPERATING METHOD THEREOF

(71) Applicant: SK hynix Inc., Icheon (KR)

(72) Inventor: Jang Hun Yun, Icheon (KR)

(73) Assignee: SK hynix Inc., Icheon (KR)

( * ) Notice: Subject to any disclaimer, the term of this patent is extended or adjusted under 35 U.S.C. 154(b) by 1 day.

(21) Appl. No.: 18/311,207

(22) Filed: May 2, 2023

(65) Prior Publication Data
US 2024/0201899 A1 Jun. 20, 2024

(30) Foreign Application Priority Data
Dec. 19, 2022 (KR) .................. 10-2022-0177770

(51) Int. Cl.
G06F 3/06 (2006.01)
(52) U.S. Cl.
CPC .......... G06F 3/0659 (2013.01); G06F 3/0604 (2013.01); G06F 3/0679 (2013.01)
(58) Field of Classification Search
CPC ..... G06F 3/0604; G06F 3/0659; G06F 3/0679
See application file for complete search history.

(56) References Cited

U.S. PATENT DOCUMENTS

| | | | |
|---|---|---|---|
| 10,044,370 B1* | 8/2018 | Pasha et al. | H03M 7/30 |
| 10,579,597 B1* | 3/2020 | Anand | G06F 16/289 |
| 2004/0030847 A1* | 2/2004 | Tremaine | G06F 12/08 |
| | | | 711/158 |
| 2004/0228533 A1* | 11/2004 | Adelmann | G11B 20/00007 |
| 2005/0132161 A1* | 6/2005 | Makela | G06F 12/023 |
| | | | 711/170 |
| 2011/0082842 A1* | 4/2011 | Groseclose, Jr. | G06F 3/0638 |
| | | | 707/693 |
| 2014/0201175 A1* | 7/2014 | Ohno | G06F 16/1744 |
| | | | 707/693 |
| 2014/0215170 A1* | 7/2014 | Scarpino | G06F 3/0608 |
| | | | 711/161 |
| 2021/0048961 A1* | 2/2021 | Jean | G06F 3/0649 |
| 2021/0200469 A1* | 7/2021 | Kim | G06F 3/0656 |

FOREIGN PATENT DOCUMENTS

| | | | |
|---|---|---|---|
| KR | 1020110030071 A | 3/2011 | |
| KR | 1020180034079 A | 4/2018 | |

* cited by examiner

*Primary Examiner* — Aracelis Ruiz (57) ABSTRACT

A storage device may include a memory storing data and a controller. Such a controller may receive a compression write command from an external device to compress and write original data, compress the original data, based on whether compression information that corresponds to the compression write command is supported, into compressed data using a preset value, and store the compressed data in the memory.

21 Claims, 9 Drawing Sheets

STORAGE DEVICE FOR COMPRESSING AND STORING DATA, AND OPERATING METHOD THEREOF

CROSS-REFERENCE TO RELATED APPLICATION

The present application claims priority under 35 U.S.C. 119(a) to Korean patent application number 10-2022-0177770 filed on Dec. 19, 2022, which is incorporated herein by reference in its entirety.

TECHNICAL FIELD

Embodiments of the present disclosure relate to a storage device for compressing and storing data and operating method thereof.

BACKGROUND

A storage device is a device for storing data based on a request from an external device such as a computer, a mobile terminal such as a smart phone or tablet, or various electronic devices.

The storage device may further include a controller for controlling memory (e.g. volatile memory/non-volatile memory). The controller may receive a command from an external device, and execute or control operations to read, write, or erase data in the memory included in the storage device based on the input command.

Meanwhile, as the size of data stored in the memory is reduced, the storage device can be used more efficiently and the lifespan of the storage device can be increased. Accordingly, when writing data to the storage device, the external device may request to reduce the size of the data stored in the storage device.

SUMMARY

Embodiments of the disclosure may provide a storage device and an operating method thereof capable of reducing the size of data to be written, thereby efficiently using the storage device and increasing the lifetime of the storage device.

In one aspect, embodiments of the disclosure may provide a storage device including a memory storing data and a controller configured to (i) receive a compression write command from an external device to compress and write original data and (ii) compress the original data, based on whether compression information (e.g., a first compression algorithm and a first compression level) that corresponds to the compression write command is supported, into compressed data using a preset value (e.g., the first compression algorithm or a preset reference compression algorithm), and store the compressed data in the memory.

In another aspect, embodiments of the disclosure may provide an operating method of a storage device including (i) receiving a compression write command from an external device to compress and write original data, (ii) determining whether a first compression algorithm and a first compression level that correspond to the compressed write command are supported, (iii) compressing, based on whether the first compression algorithm and the first compression level are supported, the original data into compressed data using the first compression algorithm or a preset reference compression algorithm, and (iv) storing the compressed data into a memory of the storage device.

In another aspect, embodiments of the disclosure may provide a controller including (i) a memory interface configured to communicate with a memory storing data, and (ii) a control circuit configured to receive a compression write command from an external device to compress and write original data, to compress original data, based on whether a compression algorithm and a compression level that correspond to the compression write command are supported, into compressed data using the compression algorithm corresponding to the compression write command or a preset reference compression algorithm, and to store the compressed data in the memory.

According to embodiments of the present disclosure, it is possible to efficiently use a storage device and increase the lifespan of the storage device.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present disclosure are described below in more detail with reference to the accompanying drawings. We note, however, that the embodiments described in the present disclosure may be implemented in different forms and variations, and should not be construed as being limited to the embodiments set forth herein. Rather, the described embodiments are provided so that this disclosure will be thorough and complete. Throughout the disclosure, like reference numerals may refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

Figure 1:
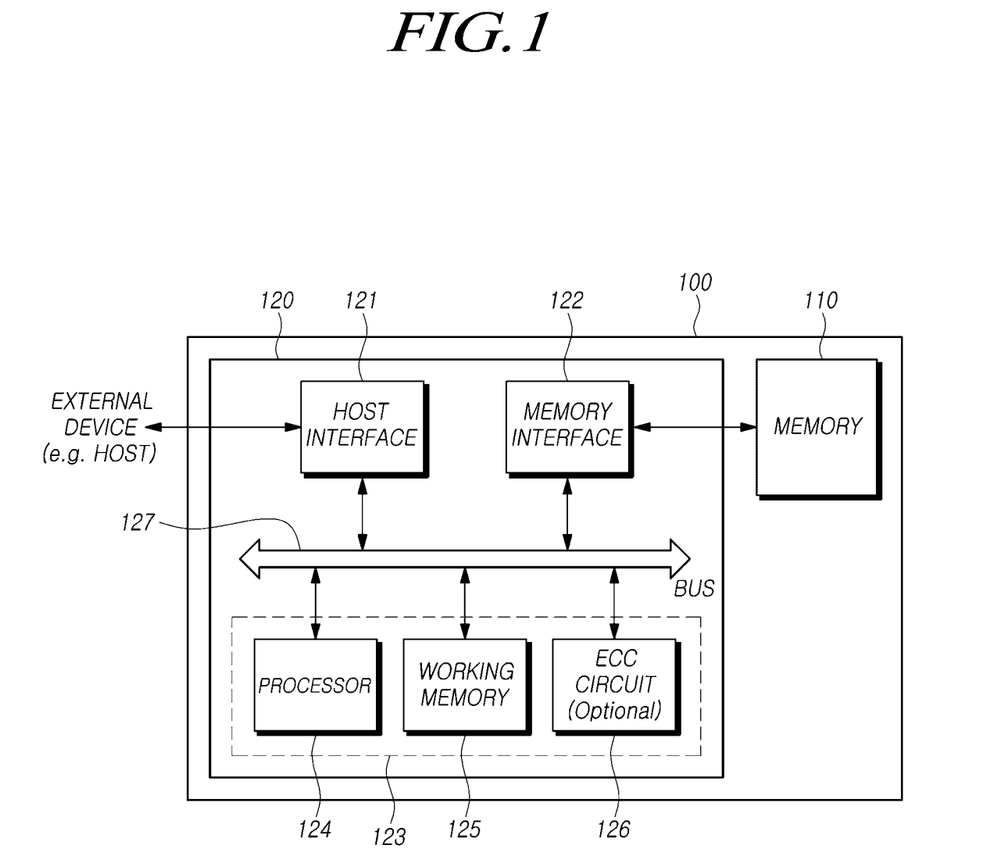
FIG. 1 is a schematic configuration diagram of a storage device according to an embodiment of the disclosure.

FIG. 1 is a schematic configuration diagram of a storage device 100 according to an embodiment of the disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include one or more of a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into a single device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses one or more of various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include one or both of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include one or more of a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware in which a logic calculation to be performed is defined is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, one or more of an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of read data when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into a single component. In addition to the above-described components 121, 122, 124, 125 and 126 of the controller 120, one or more other components may be added.

Hereinbelow, the memory 110 will be described in further detail with reference to FIG. 2.

Figure 2:
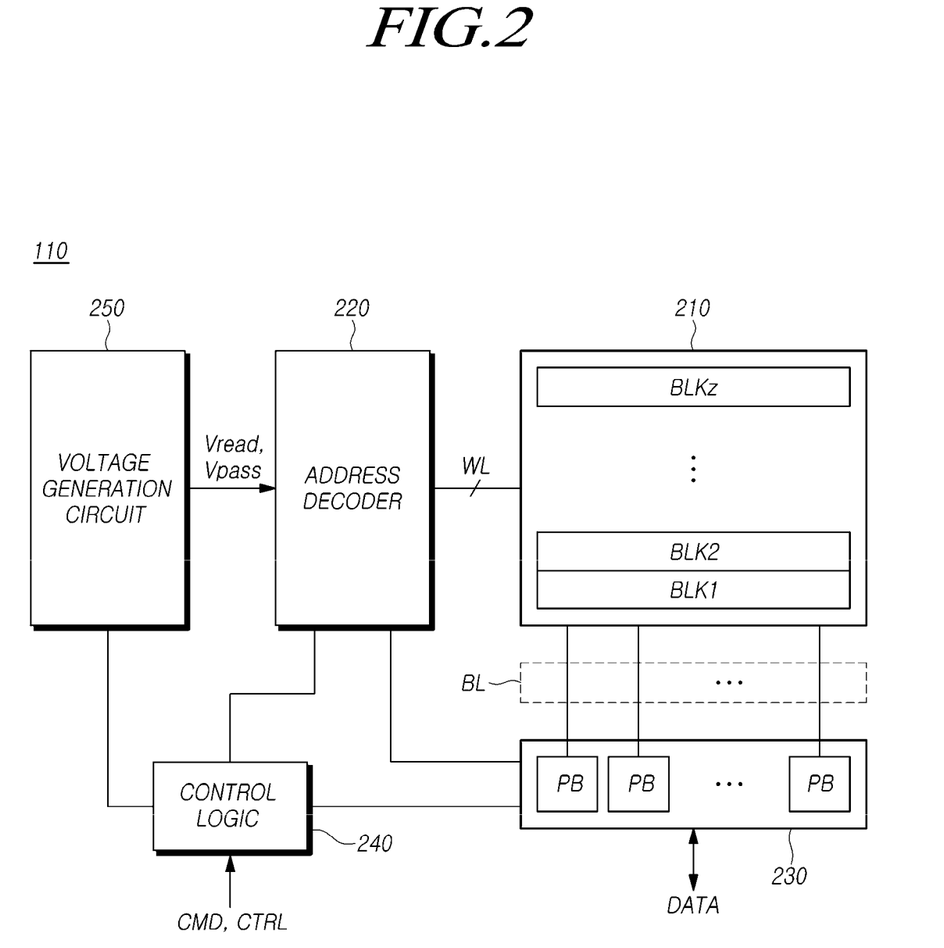
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and writhe circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include one or more of a block address, a row address and a column address.

The address decoder 220 may select one memory block and one word line depending on a block address and a row address. A column address may be decoded by the address decoder 220 and be provided to the read and write circuit 230.

The address decoder 220 may include one or more of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
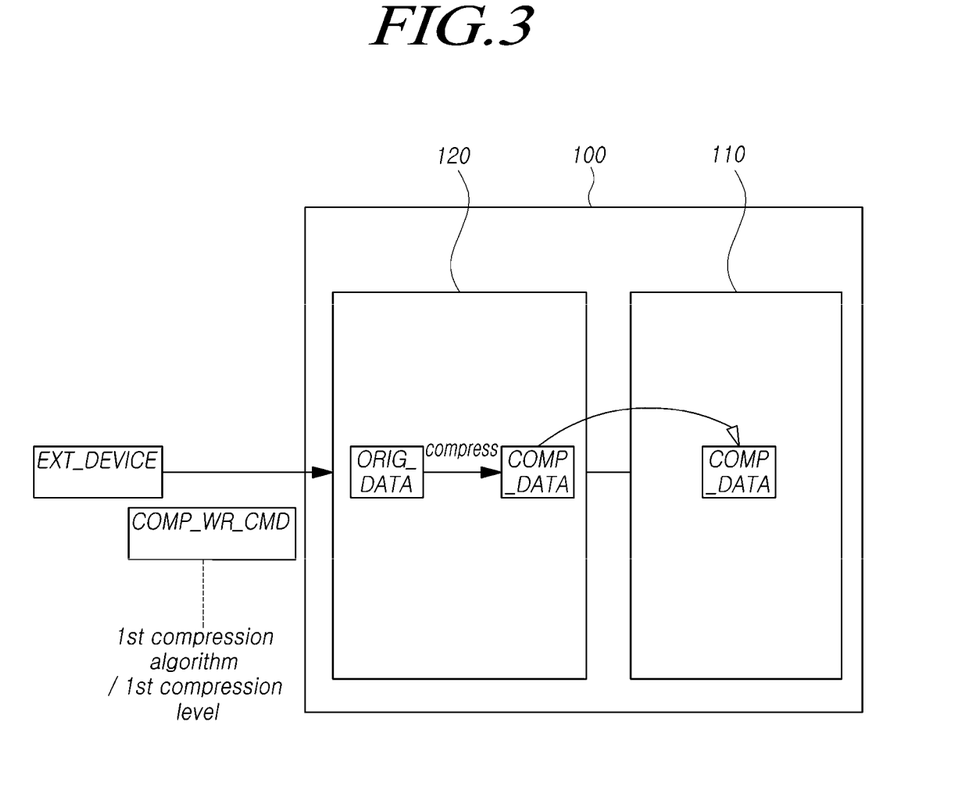
FIG. 3 illustrates an operation of a storage device according to an embodiment of the present disclosure.

FIG. 3 illustrates an operation of a storage device 100 according to an embodiment of the present disclosure.

Referring to FIG. 3, the storage device 100 may include a memory 110 and a controller 120.

The memory 110 may store data. The memory 110 may store data in the memory blocks described in FIG. 1.

The controller 120 may receive a compression write command COMP_WR_CMD from an external device EXT_DEVICE.

The compression write command COMP_WR_CMD is a write command requesting compression and writing of original data ORIG_DATA.

The controller 120 may determine whether a first compression algorithm corresponding to the compression write command COMP_WR_CMD and a first compression level corresponding to the compression write command COMP_WR_CMD are supported.

A compression algorithm may be an algorithm (e.g. Run-length, Huffman, Lempel-Zip) used to compress the original data ORIG_DATA. The external device EXT_DEVICE may request the controller 120 to set the compression algorithm to be used in compressing the original data ORIG_DATA as the first compression algorithm. In an embodiment, the external device EXT_DEVICE may set the compression algorithm to a specific value and send a signal indicating the set value to the memory 110 for compressing the original data ORIG_DATA. For example, when a first value may indicate Run-length, a second value may indicate Huffman, and a third value may indicate Lempel-Zip, the external device EXT_DEVICE may send a compression write command COMP_WR_CMD including one of the first, second, and third values indicative of the first compression algorithm to the memory 110 for compressing the original data ORIG_DATA using the first compression algorithm.

The compression level may represent the degree of compressing the original data ORIG_DATA according to a compression algorithm. The external device EXT_DEVICE may request the controller 120 to compress the original data ORIG_DATA according to the first compression level when compressing the original data ORIG_DATA using the first compression algorithm.

As an example, the compression level may indicate whether the compression algorithm is a lossy compression algorithm or a lossless compression algorithm. For example, the compression level may include a high level indicating a lossy compression algorithm and a low level indicating a lossless compression algorithm. As another example, the compression level may indicate a maximum compression rate for data.

The first compression algorithm and first compression level described above may be transmitted to the controller 120 in various manners.

For example, the first compression algorithm and the first compression level may be transmitted to the controller 120 through a compression write command COMP_WR_CMD. That is, the compression write command COMP_WR_CMD may indicate the first compression algorithm and the first compression level.

As another example, the first compression algorithm and the first compression level may be transmitted to the controller 120 through a separate setting command. These may be transmitted to the controller 120 when the storage device 100 is initialized or booted.

The controller 120 may compress the original data ORIG_DATA into compressed data COMP_DATA using the first compression algorithm or a preset reference compression algorithm based on whether the first compression algorithm and the first compression level are supported. For example, the controller 120 may compress the original data ORIG_DATA into compressed data COMP_DATA using the first compression algorithm, when the controller 120 supports the first compression algorithm. Otherwise, the controller 120 may compress the original data ORIG_DATA into compressed data COMP_DATA using the preset reference compression algorithm.

The controller 120 may store the compressed data COMP_DATA in the memory 110.

The controller 120 compresses the original data ORIG_DATA into compressed data COMP_DATA and stores the compressed data, thereby reducing a space used to store data write-requested by the external device EXT_DEVICE. Accordingly the controller 120 may store data more efficiently, and as a result, may increase the lifespan of the storage device 100.

Figure 4:
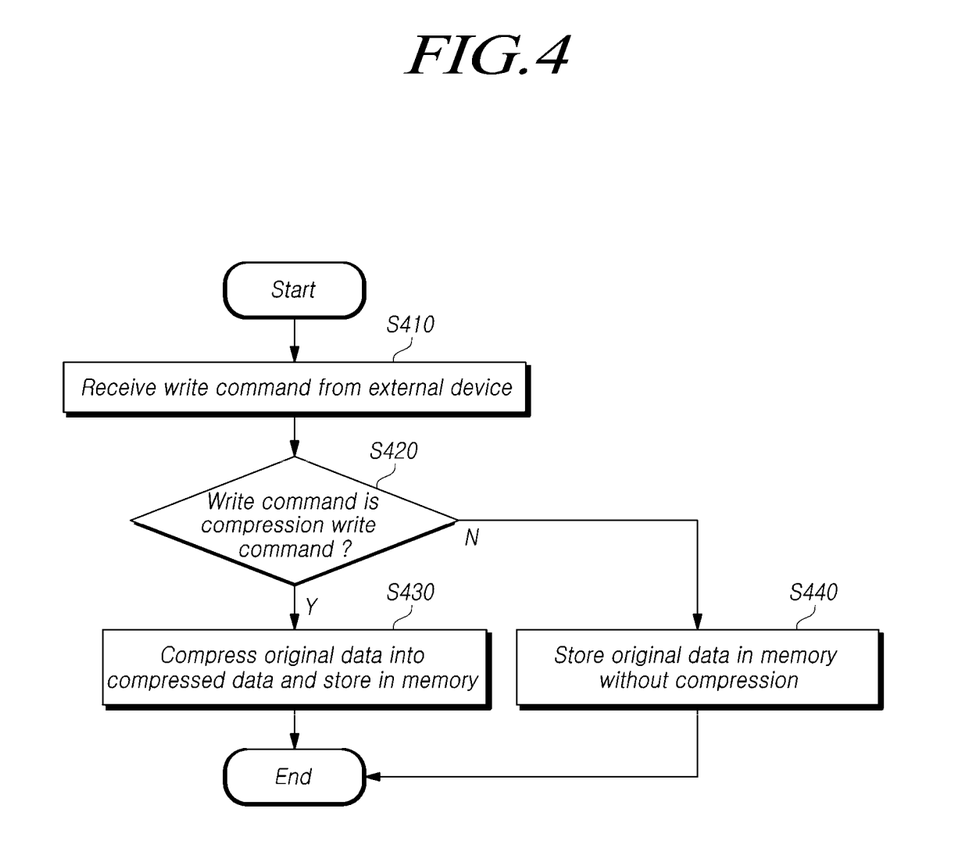
FIG. 4 is a flowchart illustrating an operation of processing a write command by a storage device according to an embodiment of the present disclosure.

FIG. 4 is a flowchart illustrating an operation of processing a write command by a storage device (e.g., the storage device 100 in FIG. 3 including the memory 110 and the controller 120) according to an embodiment of the present disclosure.

Referring to FIG. 4, the controller 120 of the storage device 100 may receive a write command from an external device EXT_DEVICE (S410).

The controller 120 may determine whether the received write command is a compression write command COMP_WR_CMD (S420).

If the received write command is the compression write command COMP_WR_CMD (S420—Y), the controller 120 may compress the original data ORIG_DATA into compressed data COMP_DATA, and then store the compressed data COMP_DATA in the memory 110 (S430).

On the other hand, if the received write command is not the compression write command COMP_WR_CMD (S420—N), the controller 120 may store the original data ORIG_DATA in the memory 110 without compression (S440).

Figure 5:
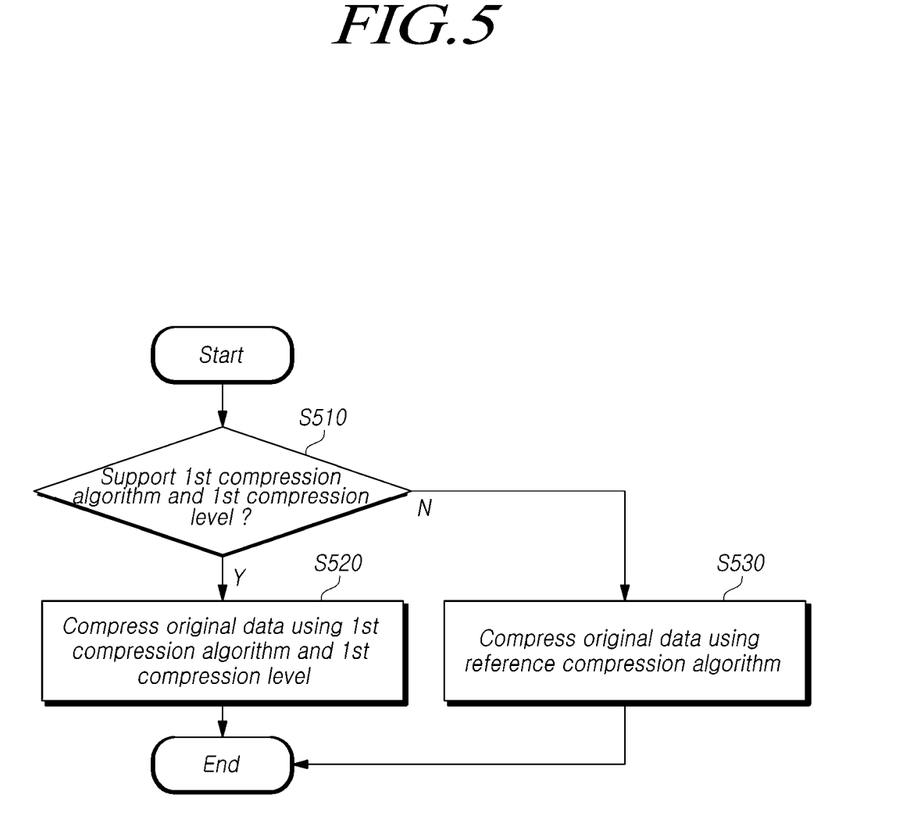
FIG. 5 is a flowchart illustrating an operation of compressing original data by a storage device according to an embodiment of the present disclosure.

FIG. 5 is a flowchart illustrating an operation of compressing original data ORIG_DATA by a storage device (e.g., the storage device 100 in FIG. 3 including the memory 110 and the controller 120) according to an embodiment of the present disclosure.

Referring to FIG. 5, the controller 120 of the storage device 100 may determine whether a first compression algorithm and a first compression level (S510) are supported by the controller 120. When the controller 120 supports the first compression algorithm and the first compression level, it may indicate that the controller 120 can perform an operation of compressing specific data based on the first compression algorithm and the first compression level.

If the controller 120 supports both the first compression algorithm and the first compression level (S510—Y), the controller 120 may compress the original data ORIG_DATA into compressed data COMP_DATA based on the first compression algorithm (S520).

If the controller 120 does not support at least one of the first compression algorithm and the first compression level (S510—N), the controller 120 may compress original data ORIG_DATA into the compressed data COMP_DATA based on a preset reference compression algorithm (S530). In this case, the compression level for the reference compression algorithm may also be a preset reference compression level.

Meanwhile, the controller 120 may further store, while storing the compressed data COMP_DATA in the memory 110, the information indicating a second compression algorithm which is a compression algorithm used to compress the original data ORIG_DATA into the compressed data COMP_DATA and a second compression level which is a compression level used to compress the original data ORIG_DATA into the compressed data COMP_DATA in the memory 110. The second compression algorithm and the second compression level may be i) the same as the first compression algorithm and the first compression level or ii) the same as the reference compression algorithm and the reference compression level.

Figure 6:
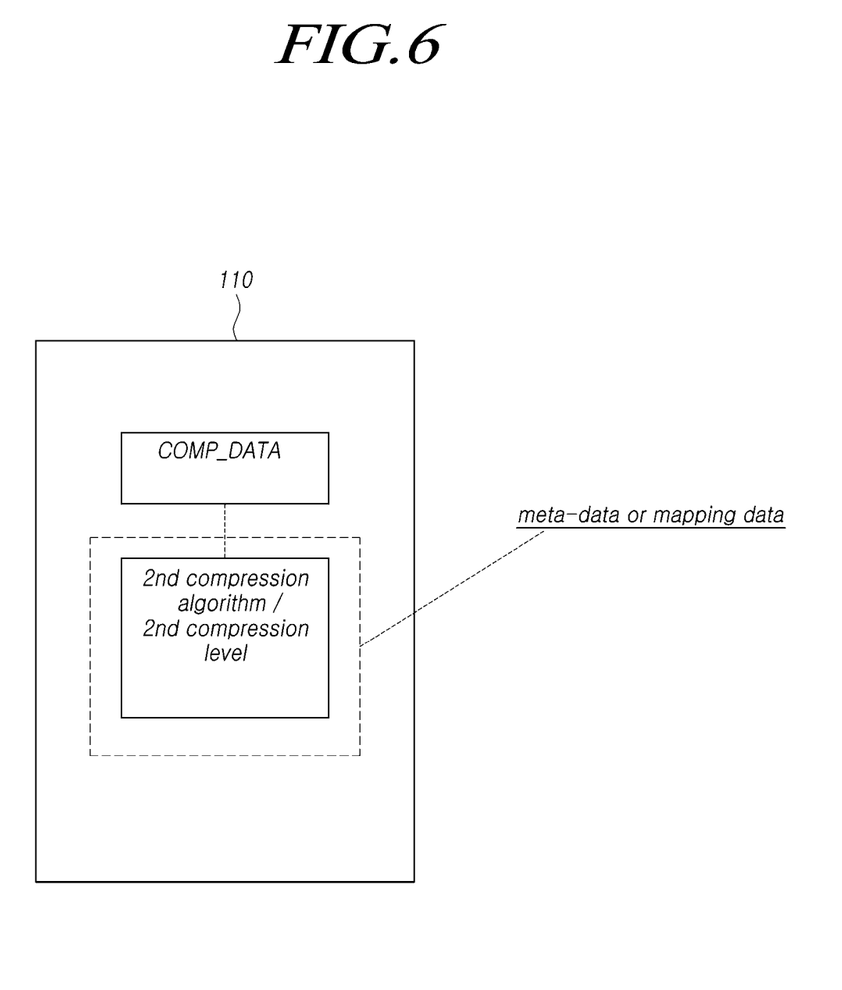
FIG. 6 illustrates a storage device that stores information on a compression algorithm and compression level used to compress original data into compressed data in a memory according to an embodiment of the present disclosure.

FIG. 6 illustrates a storage device (e.g., the storage device 100 in FIG. 3 including the memory 110 and the controller 120) storing information on a compression algorithm and compression level used to compress original data ORIG_DATA into compressed data COMP_DATA in the memory 110, according to an embodiment of the present disclosure.

Referring to FIG. 6, the memory 110 of the storage device 100 may store the information about the second compression algorithm and the second compression level in the memory 110 as metadata for the compressed data COMP_DATA or as a part of mapping data indicating a mapping relationship between a logical address and a physical address corresponding to the compressed data COMP_DATA. For example, the mapping data may store information about the second compression algorithm and the second compression level in a reserved bit among a given bytes (e.g., four bytes) allocated to store a physical address.

The metadata for the compressed data COMP_DATA may be data for managing the compressed data COMP_DATA. When storing the compressed data COMP_DATA in the memory 110, the controller 120 may store in the memory 110 additional metadata indicating a compression algorithm and a compression level for compressed data COMP_DATA in addition to general metadata (e.g., page mapping information, page status information).

The mapping data corresponding to the compressed data COMP_DATA may include a logical address corresponding to the compressed data COMP_DATA and a physical address corresponding to the logical address. In this case, the controller 120 may add information indicating a compression algorithm and compression level to extra bits excluding bits used to indicate a logical address or a physical address in the mapping data.

In the above, there has been described an operation of the storage device 100 processing the compression write command COMP_WR_CMD received from the external device EXT_DEVICE.

Hereinafter, it will be described an operation of the storage device 100 processing a decompression read command received from the external device EXT_DEVICE.

Figure 7:
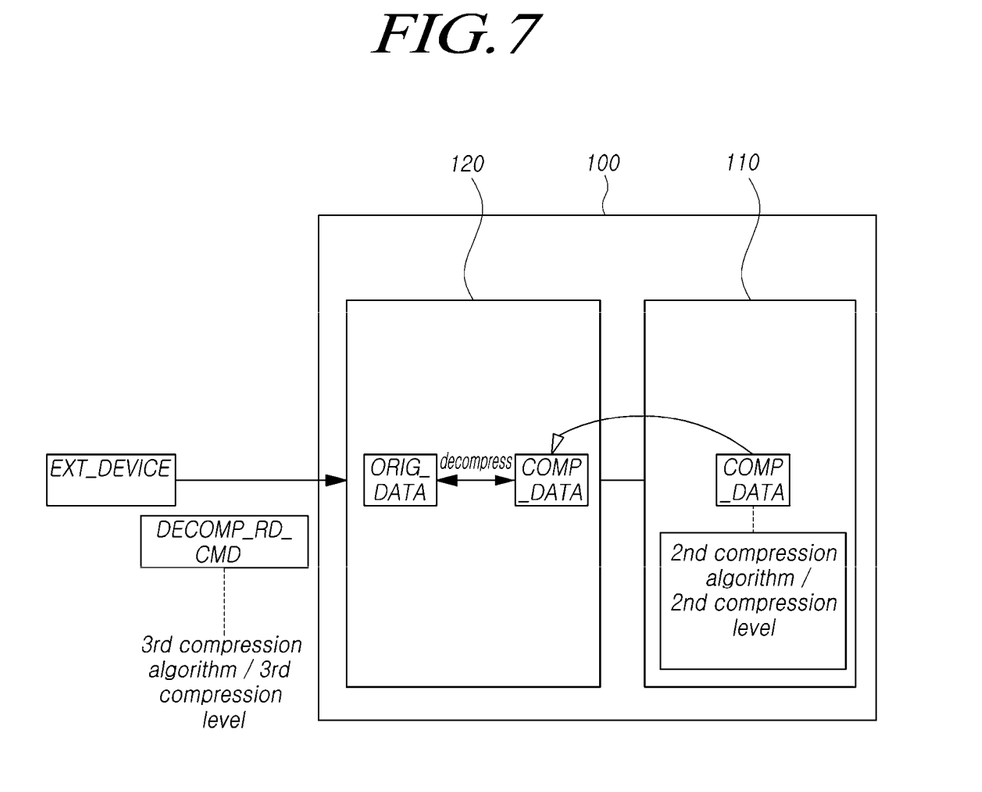
FIG. 7 illustrates an operation of a storage device according to another embodiment of the present disclosure.

FIG. 7 illustrates an operation of a storage device 100 including a memory 110 and a controller 120 according to an embodiment of the present disclosure.

Referring to FIG. 7, the controller 120 of the storage device 100 may receive a decompression read command DECOMP_RD_CMD, which is a read command requesting decompression and reading of compressed data COMP_DATA, from an external device EXT_DEVICE.

For example, in the case that the resources (e.g., CPU, memory) required to directly decompress the compressed data COMP_DATA are less than the threshold resource, the external device EXT_DEVICE may request the storage device 100 to decompress and read the compressed data COMP_DATA by transmitting the decompression read command DECOMP_RD_CMD to the storage device 100.

The controller 120 may determine whether a third compression algorithm which is a compression algorithm corresponding to the decompression read command DECOMP_RD_CMD, and a third compression level which is a compression level corresponding to the decompression read command DECOMP_RD_CMD match or coincide with the second compression algorithm and the second compression level used to compress the original data ORIG_DATA into the compressed data COMP_DATA.

The third compression algorithm and third compression level may be transmitted to the controller 120 in various manners.

For example, the third compression algorithm and the third compression level may be transmitted to the controller 120 through a decompression read command DECOMP_RD_CMD. That is, the decompression read command DECOMP_RD_CMD may indicate the third compression algorithm and the third compression level.

As another example, the third compression algorithm and the third compression level may be transmitted to the controller 120 through a separate setting command. This setting command may be transmitted to the controller 120 when the storage device 100 is initialized or booted.

The controller 120 may decompress the compressed data COMP_DATA into the original data ORIG_DATA using the third compression algorithm or the reference compression algorithm based on whether the third compression algorithm and the third compression level coincide with the second compression algorithm and the second compression level stored in the memory 110.

Figure 8:
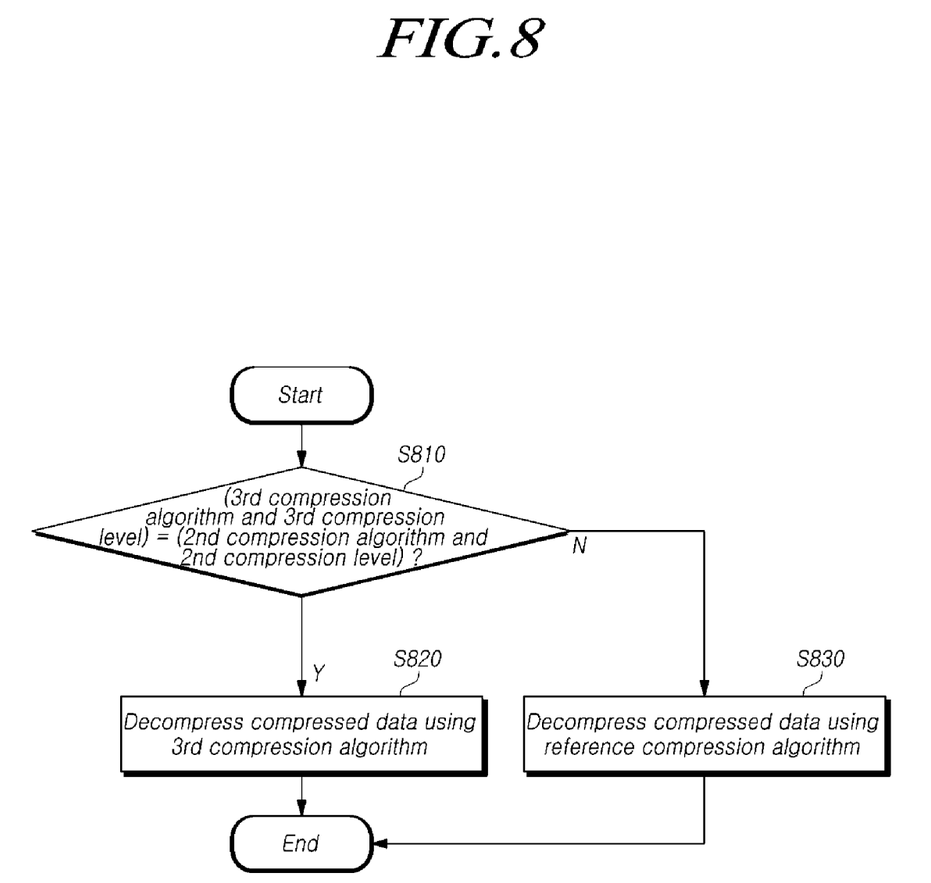
FIG. 8 is a flowchart illustrating an operation of decompressing compressed data by a storage device according to an embodiment of the present disclosure.

In addition, the controller 120 may transmit original data ORIG_DATA to an external device EXT_DEVICE. For example, the external device EXT_DEVICE may request the storage device 100 to decompress the compressed data COMP_DATA into the original data ORIG_DATA, when the external device EXT_DEVICE does not have enough resources for decompression. In an embodiment, when the amount of memory in the external device EXT_DEVICE is less than a threshold amount to decompress the compressed data COMP_DATA in the external device EXT_DEVICE, the external device EXT_DEVICE may request the storage device 100 to decompress the compressed data COMP_DATA and transmit the decompressed data to the external device EXT_DEVICE. In an embodiment, when a processor idle percentage of the CPU is less than a threshold value, the external device EXT_DEVICE may request the storage device 100 to decompress the compressed data COMP_DATA and transmit the decompressed data to the external device EXT_DEVICE. As a result, available resources may be used efficiently in a system including the external device EXT_DEVICE and the storage device 100 according to an embodiment of the present disclosure. On the other hand, the external device EXT_DEVICE may request the storage device 100 to send the compressed data COMP_DATA and decompress the received compressed data COMP_DATA in the external device EXT_DEVICE, when the external device EXT_DEVICE has enough resources for decompression. FIG. 8 is a flowchart illustrating an operation of decompressing compressed data COMP_DATA by a storage device 100 including a memory 110 and a controller 120 according to an embodiment of the present disclosure.

Referring to FIG. 8, the controller 120 of the storage device 100 may determine whether the third compression algorithm and the third compression level coincide with the second compression algorithm and the second compression level (S810).

If the third compression algorithm and the third compression level coincide with the second compression algorithm and the second compression level, respectively (S810—Y), the controller 120 may decompress the compressed data COMP_DATA into the original data ORIG_DATA using the third compression algorithm and the third compression level (S820).

In addition, if the third compression algorithm does not coincide with the second compression algorithm, or the third compression level does not coincide with the second compression level, or both, at S810—N, the controller 120 may decompress the compressed data COMP_DATA into the original data ORIG_DATA using a reference compression algorithm (S830).

Figure 9:
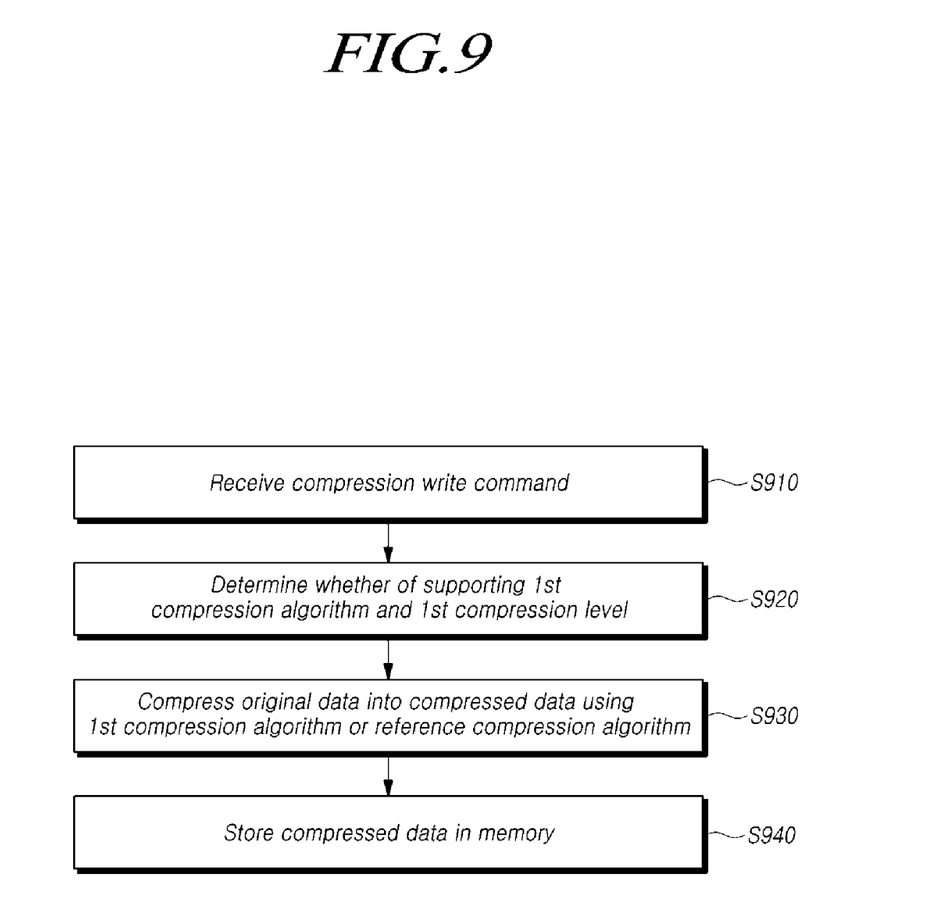
FIG. 9 illustrates an operating method of a storage device according to an embodiment of the present disclosure.

FIG. 9 illustrates an operating method of a storage device 100 according to an embodiment of the present disclosure.

Referring to FIG. 9, an operating method of a storage device 100 may include receiving a compression write command COMP_WR_CMD requesting compression and writing of original data ORIG_DATA from an external device EXT_DEVICE (S910).

The operating method of the storage device 100 may include determining whether the storage device supports a first compression algorithm corresponding to a compression write command COMP_WR_CMD received in step S910 and a first compression level corresponding to the compression write command COMP_WR_CMD (S920). In this case, the first compression level may indicate whether the first compression algorithm is a lossy compression algorithm or a lossless compression algorithm.

The operating method of the storage device 100 may include compressing original data ORIG_DATA into compressed data COMP_DATA using a first compression algorithm or a preset reference compression algorithm based on whether a first compression algorithm and a first compression level are supported by the storage device 100 (S930).

For example, in step S930, if the first compression algorithm and the first compression level are supported, the original data ORIG_DATA may be compressed into the compressed data COMP_DATA using the first compression algorithm and the first compression level. In addition, one or both of the first compression algorithm and the first compression level are not supported, the original data ORIG_DATA may be compressed into compressed data COMP_DATA using a reference compression algorithm.

The operating method of the storage device 100 may include storing the compressed data COMP_DATA in the memory 110 (S940).

Meanwhile, the operating method of the storage device 100 may further include storing information indicating a second compression algorithm which is a compression algorithm used to compress the original data ORIG_DATA into the compressed data COMP_DATA and a second compression level which is a compression level used to compress the original data ORIG_DATA into the compressed data COMP_DATA in the memory 110.

In this case, the information indicating the second compression algorithm and the second compression level may be stored in the memory 110 as metadata for the compressed data COMP_DATA or as a part of mapping data indicating a mapping relationship between a logical address and a physical address corresponding to the compressed data COMP_DATA.

Meanwhile, the operating method of the storage device 100 may further include (i) receiving a decompression read command DECOMP_RD_CMD requesting decompression and reading of the compressed data COMP_DATA from an external device EXT_DEVICE, (ii) determining whether the third compression algorithm which is a compression algorithm corresponding to the decompression read command DECOMP_RD_CMD and the third compression level which is a compression level corresponding to the decompression read command DECOMP_RD_CMD match or coincide with the second compression algorithm and the second compression level, (iii) decompressing the compressed data COMP_DATA into the original data ORIG_DATA using the third compression algorithm or the reference compression algorithm based on whether the third compression algorithm and the third compression level coincide with the second compression algorithm and the second compression level, and (iv) transmitting original data ORIG_DATA to an external device EXT_DEVICE.

In this case, in the step of decompressing the compressed data COMP_DATA into the original data ORIG_DATA, if the third compression algorithm and the third compression level coincide with the second compression algorithm and the second compression level, the compressed data COMP_DATA may be decompressed into original data ORIG_DATA using the third compression algorithm. In addition, if one or both of the third compression algorithm and the third compression level do not coincide with the second compression algorithm and the second compression level, the compressed data COMP_DATA may be decompressed into original data ORIG_DATA using the reference compression algorithm.

Although various embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
   a memory for storing data; and
   a controller configured to:
   receive a compression write command from an outside of the storage device to compress and write original data;
   compress the original data, based on whether compression information that corresponds to the compression write command is supported, into compressed data using a preset value; and
   store the compressed data in the memory,
   wherein the compression information includes a first compression algorithm, and the preset value includes the first compression algorithm or a preset reference compression algorithm, and
   wherein the controller compresses the original data into the compressed data using the first compression algorithm when the first compression algorithm indicated by the compression write command is supported, and compresses the original data into the compressed data using the preset reference compression algorithm when the first compression algorithm indicated by the compression write command is not supported.

2. The storage device of claim 1, wherein the compression information further includes a first compression level.

3. The storage device of claim 2, wherein the controller compresses the original data into the compressed data using the first compression algorithm when the first compression level is additionally supported, and compresses the original data into the compressed data using the preset reference compression algorithm when one or both of the first compression algorithm and the first compression level are not supported.

4. The storage device of claim 2, wherein the first compression level indicates whether the first compression algorithm is a lossy compression algorithm or a lossless compression algorithm.

5. The storage device of claim 2, wherein the controller further stores information indicating a second compression algorithm and a second compression level into the memory, the second compression algorithm and the second compression level being used to compress the original data into the compressed data.

6. The storage device of claim 5, wherein the controller stores the information indicating the second compression algorithm and the second compression level as metadata for the compressed data or as a part of mapping data indicating a mapping relationship between a logical address and a physical address corresponding to the compressed data.

7. The storage device of claim 6, wherein the controller decompresses the compressed data into the original data using the stored second compression algorithm.

8. The storage device of claim 5, wherein the controller receives a decompression read command from the outside to decompress and read the compressed data, and
   wherein the controller decompresses, based on whether a third compression algorithm and a third compression level that correspond to the decompression read command coincide with the second compression algorithm and the second compression level, the compressed data into the original data using the third compression algorithm or the reference compression algorithm, and transmits the original data to the outside.

9. The storage device of claim 8, wherein the controller decompresses the compressed data into the original data using the third compression algorithm when the third compression algorithm and the third compression level coincide with the second compression algorithm and the second compression level, respectively, and the controller decompresses the compressed data into the original data using the preset reference compression algorithm when the third compression algorithm does not coincide with the second compression algorithm, or the third compression level does not coincide with the second compression level, or both.

10. The storage device of claim 1, wherein the controller of the storage device decompresses the compressed data into the original data when the outside has an amount of memory less than a threshold amount, or a processor idle percentage is less than a threshold value, or both, and transmits the original data to the outside.

11. The storage device of claim 1, wherein the controller transmits the compressed data to the outside and the outside decompresses the compressed data, when the outside has one or more resources sufficient to decompress the compressed data into the original data.

12. An operating method of a storage device comprising:
   receiving a compression write command from an outside of the storage device to compress and write original data;
   determining whether a first compression algorithm and a first compression level that correspond to the compressed write command are supported;
   compressing, based on whether the first compression algorithm and the first compression level are supported, the original data into compressed data using the first compression algorithm or a preset reference compression algorithm; and
   storing the compressed data into a memory of the storage device, wherein compressing the original data comprises compressing the original data into the compressed data using the first compression algorithm when the first compression algorithm indicated by the compression write command is supported, and compressing the original data into the compressed data using the preset reference compression algorithm when the first compression algorithm indicated by the compression write command is not supported.

13. The operating method of claim 12, wherein compressing the original data comprises compressing the original data into the compressed data using the first compression algorithm when the first compression level is additionally supported, and compressing the original data into the compressed data using the reference compression algorithm when one or both of the first compression algorithm and the first compression level are not supported.

14. The operating method of claim 12, wherein the first compression level indicates whether the first compression algorithm is a lossy compression algorithm or a lossless compression algorithm.

15. The operating method of claim 12, further comprising storing information indicating a second compression algorithm and a second compression level into the memory, the second compression algorithm and the second compression level being used to compress the original data into the compressed data.

16. The operating method of claim 15, wherein the information indicating the second compression algorithm and the second compression level is stored in the memory as metadata for the compressed data or as a part of mapping data indicating a mapping relationship between a logical address and a physical address corresponding to the compressed data.

17. The operating method of claim 16, further comprising:
decompressing the compressed data into the original data using the stored second compression algorithm; and
transmitting the original data to the outside.

18. The operating method of claim 15, further comprising:
receiving a decompression read command from the outside to decompress and read the compressed data;
determining whether a third compression algorithm and a third compression level that correspond to the decompression read command coincide with the second compression algorithm and the second compression level;
decompressing, based on whether the third compression algorithm and the third compression level coincide with the second compression algorithm and the second compression level, the compressed data into the original data using the third compression algorithm or the preset reference compression algorithm; and
transmitting the original data to the outside.

19. The operating method of claim 18, wherein decompressing the compressed data comprises:
decompressing the compressed data into the original data using the third compression algorithm when the third compression algorithm and the third compression level coincide with the second compression algorithm and the second compression level, respectively; and
decompressing the compressed data into the original data using the reference compression algorithm when the third compression algorithm does not coincide with the second compression algorithm, or the third compression level does not coincide with the second compression level, or both.

20. The operating method of claim 12, further comprising:
decompressing the compressed data into the original data when the outside has an amount of memory less than a threshold amount, or a processor idle percentage is less than a threshold value, or both; and
transmitting the original data to the outside.

21. A controller of a storage device, the controller comprising:
a memory interface configured to communicate with a memory storing data; and
a control circuit configured to receive a compression write command from an outside of the storage device to compress and write original data, to compress original data, based on whether a compression algorithm and a compression level that correspond to the compression write command are supported, into compressed data using the compression algorithm corresponding to the compression write command or a preset reference compression algorithm, and to store the compressed data in the memory,
wherein the control circuit is configured to compress the original data into the compressed data using the compression algorithm when the compression algorithm indicated by the compression write command is supported, and compress the original data into the compressed data using the preset reference compression algorithm when the compression algorithm indicated by the compression write command is not supported.

* * * * *